Patented Apr. 12, 1927.

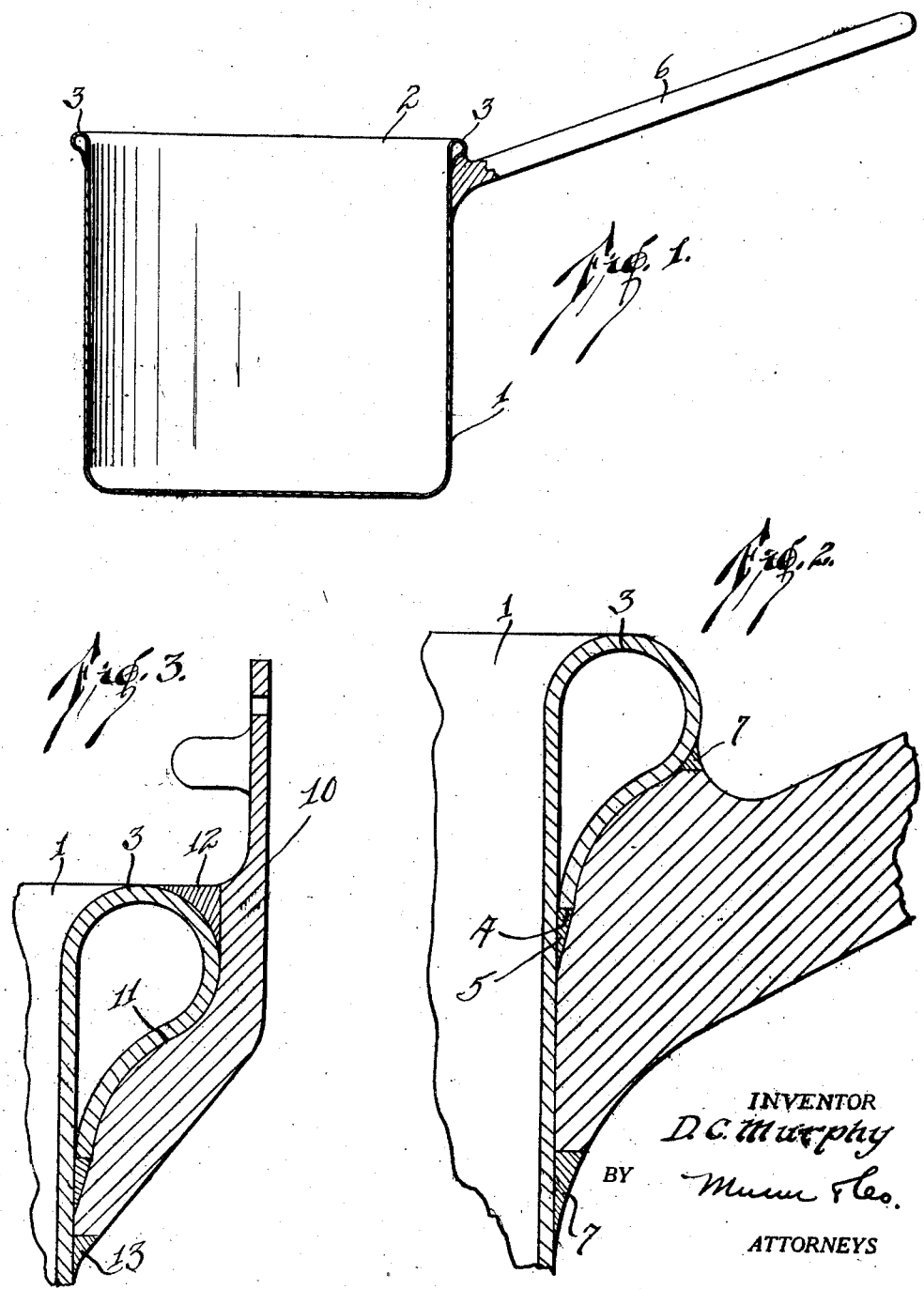

1,624,273

UNITED STATES PATENT OFFICE.

DANIEL C. MURPHY, OF SCOBEY, MONTANA.

RECEPTACLE.

Application filed December 21, 1925. Serial No. 76,936.

My invention relates to improvements in receptacles, and it consists in the combinations, constructions, and arrangements herein described and claimed.

An object of my invention is to provide a receptacle that is free from rough edges, corners, recesses, and numerous other places that are common in ordinary receptacles, and which tend to receive substances and make it difficult or rather impossible to keep them clean.

A further object of my invention is to provide a receptacle of the type described which may be readily and thoroughly cleaned, thus rendering the device sanitary.

A further object of my invention is to provide a receptacle of the type described which is simple in construction, durable and thoroughly efficient for the purpose intended.

Other objects and advantages will appear in the following specification, and the novel features of the invention will be particularly pointed out in the appended claim.

My invention is illustrated in the accompanying drawings, forming part of this application, in which—

Figure 1 is a sectional view of the device,

Figure 2 is an enlarged fragmentary view of the device, and

Figure 3 is a modified form of the device.

In carrying out my invention, I provide a body portion 1 which can be of any desired form. The body 1 is provided with an opening 2. The body is also provided with a bead 3 which extends around the opening 2 and is formed by pressing the metal outwardly and downwardly in an arcuate path, as shown in Figure 2. The edge 4 of the metal is then welded, as at 5, to the body portion 1. After the welding, the device is smoothed off in such a manner that the material of the welding will cause the surface of the bead to taper into the body portion 1. In this manner, there are no corners, recesses, or sharp edges whereby any substances may collect. A handle 6, having one end thereof shaped so as to conform to the body portion 1 and the bead 3, is placed against them and welded in place, as indicated at 7. When the handle 6 is welded in place, the material caused by the welding is smoothed off in such a manner that the handle will gradually taper into the body portion and the bead, as is clearly shown in Figure 2.

From the foregoing description of the various parts of the device, the operation thereof may be readily understood. In forming the device, the body portion 1 may be of any desired shape which can be stamped out of sheet metal and having an opening therein. The edge of the metal is formed into a bead in such a manner as to render the device free from any recesses or sharp edges which would tend to collect and retain any substances. The handle 6 is secured to the body portion 1 in such a manner that the handle will gradually taper into the body portion. In Figure 3, I have shown a modified form of the device, the body 1 being of the same construction as shown in Figure 1. A bracket 10 having a surface 11, which conforms to the bead 3 and the body portion 1, is put in place, as shown in Figure 3, and welded at points 12 and 13. The metal caused by the welding is smoothed off in such a manner as to cause the bracket to gradually taper into the bead 3 and the body portion 1.

It is obvious that a wire may be used in the bead 3 to reinforce the device if desired.

In the construction of an ordinary receptacle, the edge of the metal which forms the bead around the upper edge thereof does not touch the body and form a seal-tight connection, thus allowing substances to collect therein which are difficult and almost impossible to remove. Even if a seal-tight connection was made, there would be a groove between the bead and the body which would be very difficult and almost impossible to keep clean. In an ordinary receptacle, when the contents is poured out into a dish or other receptacle, a portion of the contents is most likely to pass around the bead and become lodged in the recess between the bead and the body of the receptacle and remain there. When the receptacle is cleaned, the substances between the bead and the body portion are most likely to be overlooked, and when the receptacle is again used and the contents thereof poured out, a portion of the contents may again pass around the bead and mix with the substance which has remained there and become impure, thus making the device unsanitary.

I claim:

A receptacle comprising a body portion open at one end, a bead on said body portion adjacent to said opening, said bead being bent outwardly, downward, and inwardly in arcuate paths, the lower edge of said bead being welded to said body portion, the material of said welded portion being smoothed so as to cause the outer arcuate surfaces of said bead and said body portion to taper into each other, and a handle having the portion adjacent said bead and said body portion conforming thereto and welded in place, the material of said last named welded portion being smoothed so as to cause the outer surface of said handle, said bead, and said body portion to taper into each other.

DANIEL C. MURPHY.